SEMICONDUCTOR JUNCTION-TYPE RECTIFIER SYSTEMS

Filed Dec. 11, 1956 3 Sheets-Sheet 1

United States Patent Office 2,895,100

Patented July 14, 1959

2,895,100

SEMICONDUCTOR JUNCTION-TYPE RECTIFIER SYSTEMS

Ludwig Filberich, Berlin-Siemensstadt, Dietrich v. Haebler, Berlin-Charlottenburg, and Hans Nagorsen, Berlin-Siemensstadt, Germany, assignors to Siemens-Schuckertwerke Aktiengesellschaft, Berlin-Siemensstadt and Erlangen, Germany, a corporation of Germany Application December 11, 1956, Serial No. 627,651

Claims priority, application Germany December 17, 1955

26 Claims. (Cl. 321—11)

Figure 1:
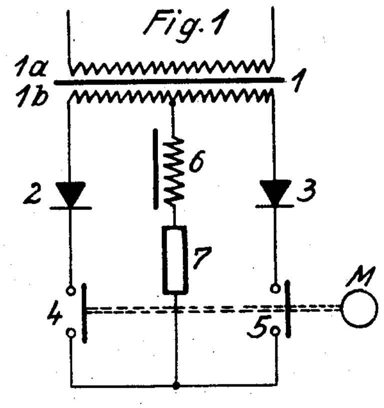

Our invention concerns improvements in the operation of electric circuit systems equipped with semiconductor rectifiers of the area type, such as silicon or germanium rectifiers, which possess one or more p-n junctions, including junctions of the type p-s-n and p-i-n.

In the operation of such semiconductor rectifier systems it has been found that at the beginning of the blocking (non-conducting) period each individual rectifier is at first traversed by a reverse leakage current of considerably larger magnitude than the reverse current that adjusts itself shortly thereafter and then remains effective during the subsequent, much longer portion of the blocking period. The rectifier just referred to is understood to denote the rectifier means that, in any particular system, are connected in an individual phase circuit of an electric feeder-line system; that is the rectifier may be formed by an individual half-wave rectifier member, by a series or parallel connection of such half-wave semiconductor rectifiers, or of any combination of series and parallel connections of individual rectifiers. The mentioned increase in reverse leakage current at the beginning of a blocking phase of an individual rectifier is apparently due to the fact that the charge carriers previously effective to conduct forward current within the individual semiconductor bodies vanish only upon elapse of a short initial time interval of the blocking period pecause of their relatively long lifetime in the order of magnitude of about 1 milli-second. These decaying charge carriers are subjected to the negative inverse voltage obtaining at the very beginning of the blocking period across the rectifier member, and thus produce the increased reverse leakage current observed. This phenomenon is all the more pronounced the more steeply the blocking voltage will increase. This explains, for instance, why the effect is particularly disturbing if the system operates with a rectangular voltage wave.

Such undesired initial increase in reverse leakage current is also particularly pronounced if semiconductor junction-type rectifiers are connected in series with mechanical switches, such as synchronously operating switches as used in contact rectifiers where the semiconductor rectifiers serve to control the output voltage of the rectifier system. Particularly when such voltage control is effected on the delayed-commutation principle over a particularly wide time range of the alternating-voltage cycle period, the negative inverse voltage at the beginning of the blocking phase commences with a particularly high front so that the temporary increase in reverse leakage current, caused by the charge carriers still effective in the semiconductors from the preceding conductance of forward current, is also particularly high.

It is an object of the invention to eliminate or greatly minimize such detrimental occurrence of initially increased leakage current.

To this end, and in accordance with our invention, we connect with the rectifiers in the individual phase circuits one or more current-controlling circuit components which modify the wave shape of the inverse voltage so as to delay its commencement and/or reduce its rate of increase, thus suppressing or considerably weakening the reverse current at the beginning of the blocking half-wave period.

In rectifier systems according to the invention, the individual rectifier member may be continuously connected into the corresponding phase circuit. However, the system, aside from the semiconductor rectifier, may also be provided with switching means which keep the positive driving voltage or the inverse blocking voltage away from the rectifier member during a portion of the cycle period. Such switching means may consist of mechanical switches similar to the synchronously operating contact devices used for mechanical rectifiers or contact converters. Also applicable are switching means of the magnetic type, formed by commutating reactors which, by virtue of their magnetic saturation properties, limit the current practically to zero during a portion of the alternating-current cycle period corresponding to a given voltage-time integral (voltage-time area of the voltage wave).

The voltage-modifying circuit components, to be connected in parallel or series with the rectifiers in the individual phase circuits of the system according to the invention, may be of different types. For instance, the semiconductor rectifier in an individual phase circuit may be provided with a shunt-connected capacitance, or with a capacitance in series with a small ohmic resistance preferably in the order of magnitude of the imaginary (reactive) impedance of the loop circuit (commutation circuit) which is alternately closed by two rectifiers in adjacent phases of the system. At any one time, only one voltage can occur across such a capacitance, and this voltage is proportional to the gradually increasing capacitive charge. As a result, the capacitance coacts with the inductance of the circuit in which the rectifier is connected and produces a flattening of the inverse voltage jump at the half-wave rectifier.

If a transformer is used for energizing the rectifier system, the just-mentioned inductance of the rectifier circuit is particularly determined by the stray inductance of the transformer. If desired, therefore, the transformer may be particularly designed for this purpose. If the stray inductance of the transformer in cooperation with the capacitance is not sufficient, then, according to another feature of the invention, we connect an additional inductance in series with the semiconductor rectifier. Particularly when using a mechanical switch of the contact-converter type in connection with such a junction-type rectifier, it is sometimes preferable to connect an auxiliary resistor parallel to the capacitance so that the capacitance can discharge itself through the auxiliary resistor prior to commencement of the next forward phase of the rectifier.

In a system according to an invention of the last-mentioned type, it may happen that the capacitance and inductance of the rectifier circuit, forming together an electric oscillator, produce undesired oscillations and excessive instantaneous amplitudes of the inverse voltage at the beginning of the blocking period; and this may partially obviate the desired effect because, although the blocking voltage increases more slowly, its instantaneous magnitudes may be higher than without the switching means.

According to another feature of the invention, therefore, we connect to the individual semiconductor rectifiers not only a capacitance in parallel, but we also provide damping components in parallel relation to the capacitance for suppressing the just-mentioned excessive oscillations. Suitable as such damping components are those consisting of an inductivity and an ohmic resistance, as well as those formed of a capacitance and an ohmic resistance, or those formed of a combination of inductance, capacitance, and ohmic resistances. If the damping component consists of an inductivity and an ohmic resistance, i.e. an LR-member (L denoting inductance and R ohmic resistance), then this member may simultaneously serve as a discharging resistance for the capacitor. If a CR member is used, the capacitance C and the ohmic resistance R being in series, then it is necessary for retaining the advantageous effect of the discharging resistance, to connect another resistor parallel to the inverse-voltage modifying capacitance.

According to another feature of the invention, the above-mentioned circuit components consist of commutating reactors, namely saturable iron-core inductivities of such rating as to be capable of absorbing a given voltage-time integral, so that the reactor can absorb the negative blocking voltage at the beginning of the blocking phase of the rectifier for a given interval of time with the effect that the value proper of the blocking voltage can occur at the rectifier only upon elapse of this time interval. As will be understood from the foregoing explanations, this interval of time must be longer than the lifetime of the charge carriers which may still be present in the individual semiconductor rectifiers due to its previous forward-conducting operation. The effect inherent in a commutating reactor of producing a current step at the beginning of forward conductance can be eliminated by auxiliary means, or this current step at the beginning of the forward phase can be made controllable for the purpose of obtaining delayed-commutation control of the feed current supply to the rectifier during each cycle period of the alternating current.

The above-mentioned and more specific objects, advantages and features of the invention will be apparent from the embodiments illustrated by way of example on the drawing, in which Figs. 1, 3, 5, 7, 9, 11, 13, 16, 17 show nine respective semiconductor rectifier systems, and Figs. 2, 4, 6, 8, 10, 12, 14, 15 are coordinate diagrams, each explanatory of the operation of the next precedingly illustrated rectifier system.

All illustrated embodiments are shown as two-component full-wave rectifier systems which are energized from an alternating-current line through a transformer 1. As indicated above, connection of the components to a polyphase power line by conventional circuit means is intended and is within the scope of the invention. The transformer primary winding is denoted by 1*a*. The secondary winding 1*b* is subdivided by a mid-tap. Connected to the secondary winding are two half-wave rectifiers 2 and 3 of the semiconductor junction type, each consisting of a single rectifier member as schematically shown or of a group of series-connected, parallel-connected, or compound-connected units. Connected in series with each rectifier 2 and 3 is a mechanical synchronous switch 4 or 5. These switches are mechanically driven by a synchronous motor M to open and close the circuit in synchronism with the feeder voltage. The connection between the motor and the switches, schematically indicated by broken lines, may comprise a drive shaft with eccentrics that act upon respective tappets to periodically lift the movable contact of each switch off its two stationary contacts in opposition to spring force, as is well known for such synchronous switches. Also connected in the rectifier network is a smoothing reactor 6 and a load 7.

The rectifier system shown in Fig. 1 is presented for explanatory purposes. It does not yet involve all features essential to the invention, although the initiation of current flow through the respective rectifiers is controlled by series-connected mechanical switches.

Figure 2:
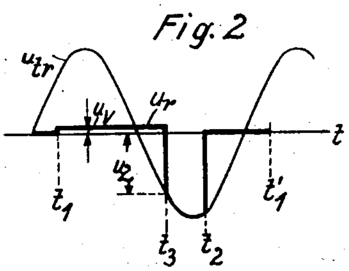

Fig. 2 shows the voltage-time curve as it may obtain in such a rectifier system when during each cycle period of the alternating current the switch 4 or 5 closes at the moment, $t_1$ and opens at the moment $t_2$. Denoted by $u_{tr}$, in the figure, is the wave of the secondary voltage of transformer 1, and the voltage across each half-wave rectifier is given the general term $u_r$. When, for instance, the switch 4 is closed at the moment $t_1$, then the corresponding phase current flows through the semiconductor rectifier 2 so that only a voltage drop of the magnitude $u_v$ occurs across the rectifier. At the moment $t_3$, the switch 5 is closed and, disregarding for simplicity the commutating effects occurring during reversal of current flow, the rectifier 3 commences to conduct current and an inverse voltage corresponding to the instantaneous value $u_2$ is impressed across rectifier 2. At this moment, however, there are still so many charge carriers left in the semiconductor rectifier 2 from the preceding forward conductance phase that, under the effect of the high negative voltage $u_2$ active across the rectifier during the remaining lifetime of the charge carriers, a correspondingly high leakage current in the blocking direction can still flow through the rectifier and may cause damage or destruction of the individual rectifiers. It is assumed that the leakage current in the reverse direction through rectifier 2 has decayed to 0 at the moment $t_2$. Consequently now the switch 4 can be opened without imposing electrical stresses upon the switch 4. Then, the inverse voltage is impressed only upon switch 4 and not upon rectifier 2 during the time interval from moment $t_2$ to the moment $t'_1$ of the next following cycle period of the alternating current.

Figure 3:
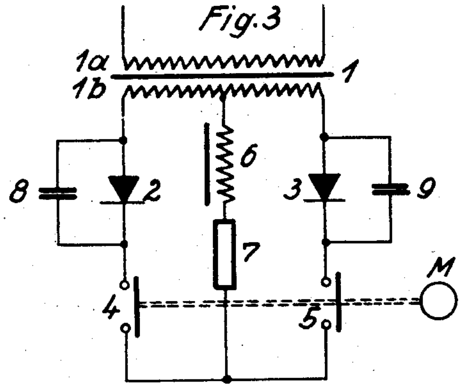

In the rectifier system according to the invention as illustrated in Fig. 3, capacitors 8 and 9 are connected parallel to the respective individual rectifiers 2 and 3 in the two phases of the system. The capacitors 8 and 9 coact with the stray inductance of transformer 1 to form a means for suppressing the detrimental effects of reverse leakage current at the beginning of the blocking phase of each half-wave rectifier.

Figure 4:
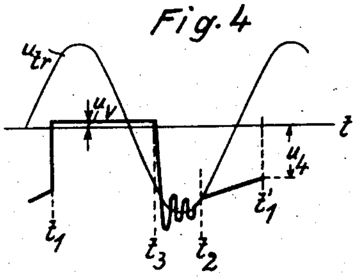

The functioning of such a system is exemplified by the voltage-time diagram in Fig. 4. While according to Fig. 2 a steep increase of negative inverse voltage occurs across rectifier 2 at the moment $t_3$, i.e. the time point when the current flow commutates from rectifier 2 to rectifier 3, the increase of voltage $u_r$ according to Fig. 4 exhibits greatly decreased steepness. Now, however, a voltage oscillation may occur at the beginning of the blocking period as schematically indicated in Fig. 4. Besides, when the rectifier system operates with mechanically actuated switches 4, 5 as shown in Fig. 3, then at the opening moment, for instance of switch 4, the capacitor 8 will remain impressed by a corresponding voltage $u_4$ as schematically represented in Fig. 4. This is so because at this moment the capacitor still has an appreciable charge which can discharge itself only at a slight rate by the normal, slight leakage current through rectifier 2.

Figure 5:
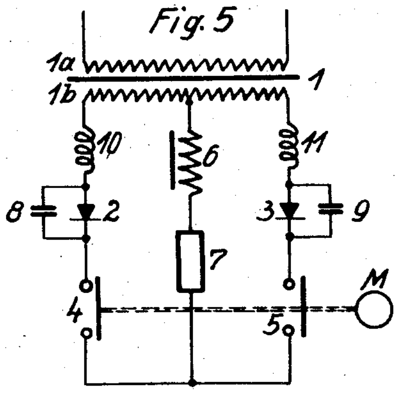

The modified system illustrated in Fig. 5 is particularly useful if the inductance inherent in the rectifier circuit, namely the stray inductance of the feeder transformer, is insufficient in conjunction with the rectifier shunt capacitor for satisfactory flattening the increase of the inverse voltage. In this embodiment, an additional inductivity 10 or 11 is series-connected in each phase circuit of the rectifier network. As shown in the voltage-time diagram of Fig. 6, the additional inductances have the effect of still further reducing the increase of the negative inverse voltage across each rectifier as compared with the embodiment of Fig. 3.

In a system as exemplified by Fig. 5, as the switch 4 commences to open, there remains an appreciable charge in capacitor 8 as explained above. At the beginning of the forward period, that is when switch 4 closes, the capacitor discharges itself and passes a high current surge through switch 4.

Figure 7:
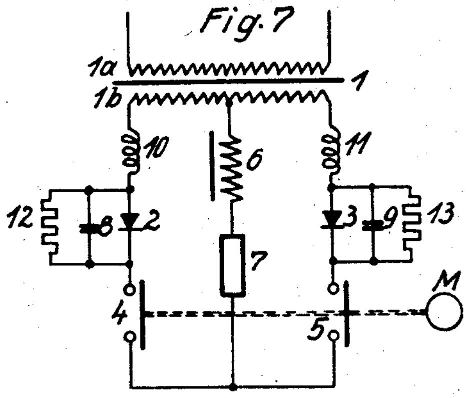

This phenomenon can be prevented, for instance in accordance with the embodiment illustrated in Fig. 7, by connecting a high discharge resistance 12, 13 parallel to each capacitor 8 and 9. The capacitor, for instance the one denoted by 8, discharges itself through the high-ohmic resistor 13 during the blocking period of rectifier 2 as soon as switch 4 opens.

Figure 8:
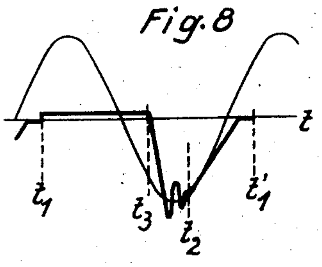
Figure 9:
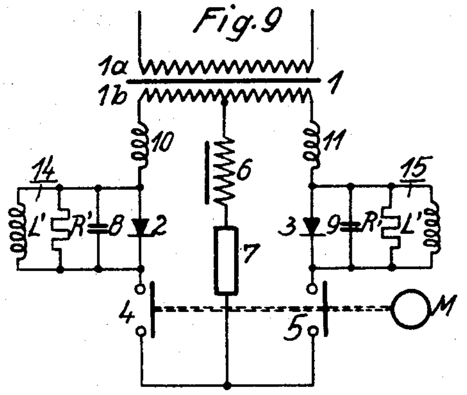

As is apparent from the corresponding voltage-time diagram of Fig. 8, the just-mentioned performance has the effect that at the end of the cycle period, and hence at the beginning of the next following forward period of the rectifier, no voltage $u_4$ (see Fig. 4) is effective across the rectifier. That is, the voltage $u_4$ has dropped to zero due to discharging of the capacitor.

Figure 6:
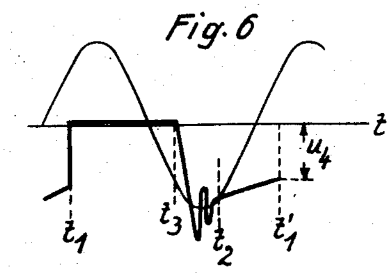
Figure 10:
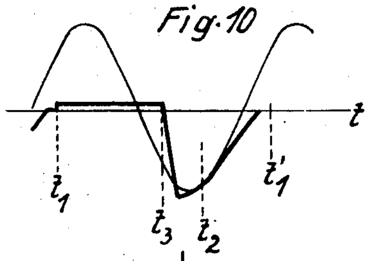
Figure 12:
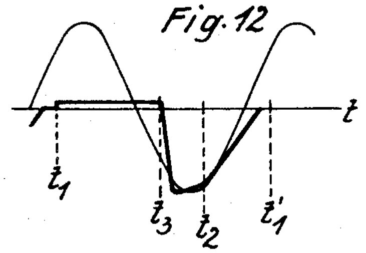

As is indicated in the voltage-time diagrams of Figs. 4, 6 and 8, the rectifier-voltage $u_r$ in the systems according to the invention described so far may still exhibit excessive oscillation at the beginning of the blocking half-wave. According to the improved system illustrated in Fig. 9, such oscillations are eliminated. This is done by connecting in shunt relation to each capacitor 8 and 9 a damping circuit which, in the illustrated system, consists of an LR member 14 or 15. Each member is composed of a parallel connection of an inductivity L′ and an ohmic resistor R′. As a result a rectifier voltage characteristic, as exemplified by Fig. 10, is obtained. The rectifier-voltage wave is no longer affected by the above-mentioned oscillations. As already explained, the LR member 14 or 15 in such a system may also operate as a discharge path for the capacitor 8 or 9.

Figure 11:
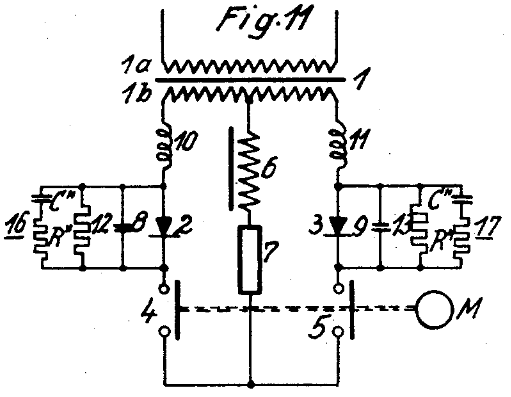

Fig. 11 shows the analogous provision of a CR member 16 and 17 consisting of a capacitor C″ in series with an ohmic resistor R″ across capacitor 8 or 9. In connection with the CR damping member, a discharging resistor 12 or 13 for capacitor 8 or 9 is provided. The corresponding voltage characteristic, shown in Fig. 12, corresponds practically to that illustrated in Fig. 10 for a corresponding rating of the circuit components.

Figure 13:
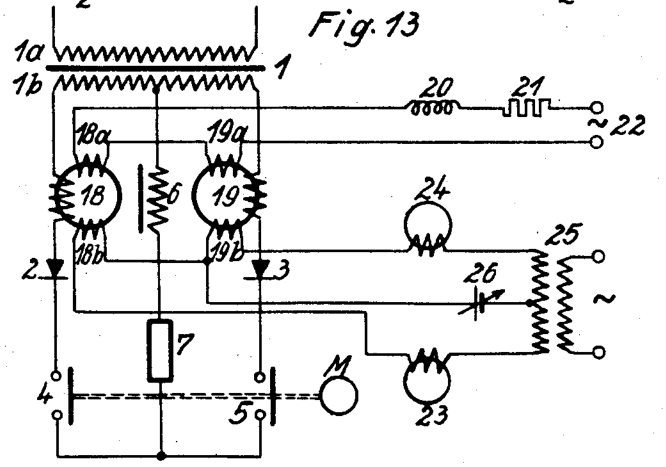

In the embodiment of Fig. 13, a commutating reactor 18, 19 is connected in series with the respective rectifiers 2 and 3. Each commutating reactor has its saturable core and ampere turns so rated that the reactor assumes the voltage drop otherwise occurring across the series-connected rectifier at the beginning of its blocking half-wave for a period of time longer than the lifetime of the charge carriers in the individual semiconductor rectifiers. Consequently, the individual rectifier devices cannot yet be subjected to inverse voltage during the initial interval in which the saturable reactors are effective. In this manner the saturable reactors limit the inverse leakage current, simultaneously imparting to the current wave a stepped shape, to such an extent that the semiconductor rectifier devices are not endangered.

Figures 14, 15:
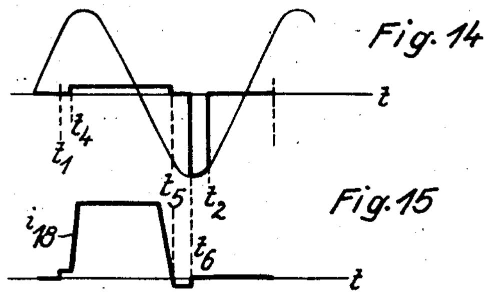

Figs. 14 and 15 exemplify voltage and current waves respectively as occurring in a system according to Fig. 13. The closing of switch 4 occurs at the moment $t_1$. From then on, the saturable commutating reactor absorbs the entire voltage up to the moment $t_4$ so that forward conductance of rectifier 2 commences only at moment $t_4$. At moment $t_5$ the semiconductor rectifier 3 commences to conduct current in accordance with properly timed closing of switch 5. From this time point $t_5$ on, the reactor 18 is impressed by the inverse voltage so that this voltage can become effective at rectifier 2 only at the moment $t_6$. Switch 4 opens at moment $t_2$.

As shown in Fig. 13, the saturable reactors 18 and 19 may be provided with additional auxiliary windings. One of these auxiliary windings **18*a*, 19*a* can be energized by a pre-magnetizing current serving for the compensation of the natural step current of the commutating reactor so that the inverse leakage current through the rectifier can be reduced to a desired small value. This pre-magnetizing current is supplied from an alternating-current source 22 in series with a resistor 21 and a smoothing reactor 20. Another auxiliary winding 18*b*, 19*b* on the core of the same commutating reactor 18 or 19 can be impressed by a voltage phase-displaced and leading with respect to the beginning of forward conductance in the appertaining rectifier. The leading voltage serves to "back-magnetize" the reactor, that is to again vary the magnetic condition of the reactor prior to the beginning of the forward phase so that a current step of selected magnitude will occur. This particular rating of the step current may directly be utilized for definitely fixing the starting moment of the rectifier forward conductance relative to the cycle period of the alternating feeder voltage. The back-magnetizing control voltage is supplied from an alternating-voltage source 25 through auxiliary saturable reactors whose step current is considerably smaller than the step current of the respective commutating reactors 18 and 19. The source 25 thus furnishes the normally very slight magnetizing current of the auxiliary reactors 23, 24. However, when the voltage of a direct-current source 26 is varied from zero upward, then the negative and positive half waves of the alternating voltage from source 25 become unbalanced relative to each other, and the auxiliary reactors 23, 24 become magnetically saturated during the respective positive half-wave periods; thus the current can temporarily increase to the step current of the commutating reactors, and during this interval of time the alternating voltage is effective at the commutating reactors 18, 19. It will be understood that the sources 22 and 25 are synchronized with the alternating feeder voltage by deriving the source voltages from the same alternating-current line that feeds the transformer 1** of the system.

Figure 16:
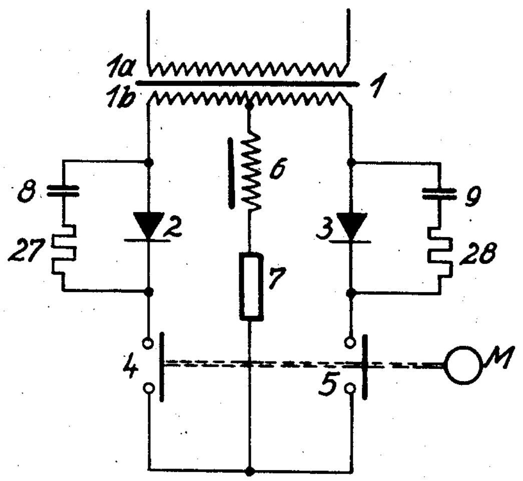

The embodiment shown in Fig. 16 is similar to that of Fig. 3 but is provided with a small ohmic resistor 27 or 28 in series with the capacitors 8 or 9.

Figure 17:
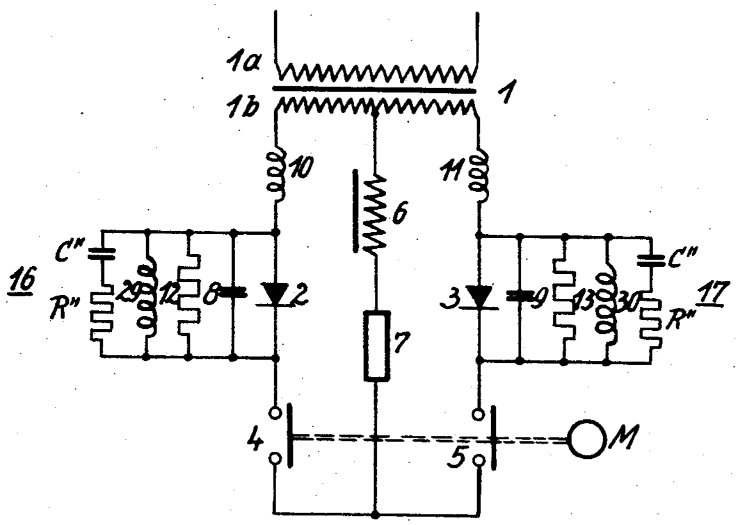

The embodiment according to Fig. 17 is similar to that of Fig. 11, except that the damping network across each capacitor 8, 9, is a combination of capacitances, resistances and inductances. That is, in addition to the impedance components shunt-connected to the respective half-wave rectifiers 2, 3 in Fig. 11, there are provided two inductance coils 29, 30 in parallel relation to the respective rectifiers 2 and 3.

The desired delay or flattening of the initial wave front of the inverse voltage of the rectifier can also be secured by a combination of any of the above-described means. Particularly the inductances 10, 11 in systems in accordance with Figs. 5, 7, 9, 10, 17 may be given an iron core which saturates at extremely small instantaneous current values so that the inductances operate as commutating reactors, as explained with reference to Fig. 13. A slight delay of the commencement of inverse rectifier voltage, due to reactor operation, may thus be combined with a reduction in the rate of voltage increase due to the reactive impedance means (8, 9, 12 to 17, 27 to 30) across the rectifier.

While the above-described embodiments of the invention are all illustrated as two-phase rectifier systems, the invention is analogously applicable and achieves the same advantages in single phase as well as in multi-phase connections either of the zero-point type or of the bridge type.

As mentioned above, the invention is generally applicable to semiconductor rectifiers of the area or junction type wherein, due to temporary persistence of charge carriers (electrons, holes), an initial increase in reverse leakage current may occur at the beginning of the blocking half-wave. It will thus be apparent that the invention applies equally well to n-p type junctions or multiple junctions and to junctions of the type p-i-n or p-s-n in which the n-conductive zone is joined with the p-conductive zone by an intermediate zone for instance of intrinsic (i) inductance. Relative to the meaning of the terms "p-n type," "p-i-n type" and "p-s-n type," reference may be had to the article by A. Herlet in the German periodical "Zeitschrift für Physik," vol. 141, pages 335 to 345 (1955), and the literature cited in the bibliography of the same article.

We claim:

1. In a semiconductor rectifier system, comprising alternating-current supply means, and a load circuit, a half-wave rectifier body of the semiconductor junction type connected between said supply means and said load circuit to supply rectified current to said load circuit, and a reactive impedance means connected with said rectifier between said supply means and said load circuit for diminishing initial increase of reverse leakage current in said semiconductor rectifier at the beginning of each blocking period, the semiconductor comprising a crystal having adjacent broad area regions of n-type conductivity and of p-type conductivity.

2. In a semiconductor rectifier system, comprising alternating-current supply means having at least one phase, a load circuit, a plurality of rectifier commutation circuit components each connecting said supply means with said load circuit and each comprising a half-wave semiconductor rectifier having at least one area p-n junction, and each of said circuit components having a reactive impedance means connected with said rectifier to reduce the initial rectifier inverse voltage whereby increase in leakage current due to residual charge carriers in the semiconductor rectifier is minimized.

3. In a semiconductor rectifier system, comprising alternating-current supply means, and a load circuit, a half-wave rectifier body comprising a semiconductor having an area p-n junction connected between said supply means and said load circuit to supply rectified current to said load circuit, and impedance means connected with said rectifier for modifying the commencing inverse-voltage wave to diminish the rate of increase of the initial reverse leakage current in said rectifier, said impedance means comprising a capacitor in parallel connection with said rectifier.

4. In a semiconductor junction rectifier system according to claim 3, said impedance means comprising a resistor connected in series with said capacitor across said rectifier.

5. A semiconductor rectifier system, comprising a current supply transformer having a plurality of secondary winding portions, a load circuit component for rectified current, a plurality of rectifier circuit components connecting said respective winding portions with said load circuit component, each of said rectifier circuit components comprising a half-wave semiconductor junction rectifier having an area p-n junction and reactive impedance means for reducing the rectifier inverse voltage at the beginning of the reverse half-wave period, said transformer having more than normal stray inductance for coacting with said impedance means to minimize increase of initial reverse leakage current.

6. A semiconductor rectifier system, comprising alternating-current supply means, a load circuit, a half-wave semiconductor rectifier having a p-n junction connected between said supply means and said load circuit to supply rectified current to said load circuit, and impedance means connected with said rectifier for modifying the commencing inverse-voltage wave to diminish the initial reverse leakage current in said rectifier, said impedance means comprising a capacitor in parallel with said rectifier and inductance means connected in series with said rectifier.

7. A semiconductor rectifier system, comprising alternating-current supply means, a load circuit, a half-wave semiconductor rectifier having a p-n junction connected between said supply means and said load circuit to supply rectified current to said load circuit, and impedance means connected with said rectifier for modifying the commencing inverse-voltage wave to minimize initial reverse leakage current in said rectifier, said impedance means comprising a capacitor in parallel with said rectifier and a discharge resistor in parallel with said capacitor and in series with the load.

8. A semiconductor rectifier system, comprising alternating-current supply means, a load circuit, a half-wave semiconductor rectifier having a p-n junction connected between said supply means and said load circuit to supply rectified current to said load circuit, and impedance means connected with said rectifier for modifying the commencing inverse-voltage wave to minimize increased initial reverse leakage current in said rectifier, said impedance means comprising a capacitor in parallel to said rectifier, and an oscillation damping circuit composed of respective reactive and ohmic impedance members and connected in parallel with said capacitor and in series with the load.

9. In a rectifier system according to claim 8, said damping circuit comprising an inductance member and an ohmic resistor both connected in parallel with said capacitor and forming a discharge path for said capacitor.

10. In a rectifier system according to claim 8, said damping circuit comprising another capacitor and an ohmic resistor connected in series with each other and in parallel with the first capacitor and rated to also form a discharge circuit for said capacitor.

11. In a semiconductor rectifier system, comprising alternating-current supply means, and a load circuit, a half-wave semiconductor rectifier having an area p-n junction connected between said supply means and said load circuit to supply rectified current to said load circuit, and impedance means connected with said rectifier for modifying the commencing inverse-voltage wave to minimize increased initial reverse leakage current in said rectifier, said impedance means comprising a saturable-core reactor connected in series with said rectifier and having a voltage-drop rating equal to the rectifier inverse voltage during an initial portion of the reverse half-wave period longer than the life time of residual charge carriers in said semiconductor resistor.

12. In a semiconductor rectifier system, comprising alternating-current supply means, a load circuit, a half-wave semiconductor rectifier having a p-n junction connected between said supply means and said load circuit to supply rectified current to said load circuit, a synchronous switch connected in series with said rectifier and closed during forward half-waves of said rectifier, and voltage-wave modifying reactive impedance means connected with said semiconductor rectifier for minimizing initial increase of reverse leakage current in said rectifier, said impedance means comprising a capacitor connected in parallel across the semiconductor.

13. A plural-component semiconductor rectifier system, comprising alternating-current supply means, a load circuit, a plurality of circuit components each connecting said supply means with said load circuit and each comprising a half-wave semiconductor rectifier having at least one p-n junction, each of said circuit components having a synchronous switch in series with said rectifier and closed during forward half-wave periods of said rectifier, and each having a reactive impedance means for minimizing increase in reverse leakage current at the beginning of the reverse half-wave period; said impedance means of each of said circuit components comprising a capacitor connected across the respective semiconductor rectifier but in series with the switch, and an oscillation damping circuit connected across the respective capacitor and having ohmic resistance for discharging said capacitor.

14. In a semiconductor rectifier system according to claim 11, said reactor having premagnetizing means inductively joined with the saturable reactor core for compensating said reverse leakage current down to a desired value.

15. In a semiconductor rectifier system according to claim 11, said reactor having a back-magnetizing winding on the reactor core, and controllable circuit means connected to said winding for varying its excitation, whereby said saturable reactor produces at the beginning of the rectifier forward half-wave a low-current step of a duration controllable by said controllable circuit means.

16. In a semiconductor rectifier system, comprising alternating-current supply means having at least one phase, a load circuit, a plurality of rectifier commutation circuit components each connecting said supply means with said load circuit and each comprising a half-wave semiconductor rectifier having at least one area p-n junction, and each of said circuit components having a reactive impedance means connected with said rectifier to reduce the initial rectifier inverse voltage whereby increase in leakage current due to residual charge carriers in the semiconductor rectifier is minimized, said impedance means comprising, in each of the said circuit components, a capacitor in parallel connection with the respective semiconductor and in series with the load.

17. In a semiconductor rectifier system, comprising alternating current supply means having at least one phase, a load circuit, a plurality of rectifier commutation circuit components each connecting said supply means with said load circuit and each comprising a half-wave semiconductor rectifier having at least one area p-n junction, and each of said circuit components having a reactive impedance means connected with said rectifier to reduce the initial rectifier inverse voltage whereby increase in leakage current due to residual charge carriers in the semiconductor rectifier is minimized, said impedance means comprising, in each of the said circuit components, a capacitor in parallel connection with the respective semiconductor and in series with the load, and an oscillation damping circuit connected across the respective capacitor and having ohmic resistance for discharging said capacitor.

18. In a semiconductor rectifier system, comprising alternating-current supply means having at least one phase, a load circuit, a plurality of rectifier commutation circuit components each connecting said supply means with said load circuit and each comprising a half-wave semiconductor rectifier having at least one area p-n junction, and each of said circuit components having a reactive impedance means connected with said rectifier to reduce the initial rectifier inverse voltage whereby increase in leakage current due to residual charge carriers in the semiconductor rectifier is minimized, said impedance means comprising, in each of the said circuit components, a capacitor in parallel connection with the respective semiconductor and in series with the load, and a discharge resistor in parallel with each of the said capacitors.

19. The apparatus defined in claim 16, the semiconductor being a germanium crystal.

20. The apparatus defined in claim 16, the semiconductor being a silicon crystal.

21. In a semiconductor rectifier system, comprising a transformer providing an alternating-current supply having at least one phase, the transformer providing secondary winding means, a load circuit component, a plurality of rectifier commutation circuit components connecting said secondary winding means with said load circuit component and each comprising a half-wave silicon semiconductor rectifier having at least one area p-n junction, and each of said rectifier circuit component having a reactive impedance means connected with said rectifier to reduce the initial rectifier inverse voltage whereby increase in leakage current due to residual charge carriers in the semiconductor rectifier is minimized, said impedance means comprising, in each of said rectifier circuit components, a capacitor and a resistor in series with each other and in parallel with the semiconductor and in series with the load.

22. In a semiconductor rectifier system, comprising a transformer providing an alternating-current supply having at least one phase, the transformer providing secondary winding means, a load circuit component, a plurality of rectifier commutation circuit components connecting said secondary winding means with said load circuit component and each comprising a half-wave silicon semiconductor rectifier having at least one area p-n junction, and each of said rectifier circuit components having a reactive impedance means connected with said rectifier to reduce the initial rectifier inverse voltage whereby increase in leakage current due to residual charge carriers in the semiconductor rectifier is minimized, said impedance means comprising, in each of said rectifier circuit components, a capacitor and a discharge resistor in parallel connection with each other and with the semiconductor and in series with the load.

23. In a semiconductor rectifier system, comprising a transformer providing an alternating-current supply having at least one phase, the transformer providing secondary winding means, a load circuit component, a plurality of rectifier commutation circuit components connecting said secondary winding means with said load circuit component and each comprising a half-wave germanium semiconductor rectifier having at least one area p-n junction, and each of said rectifier circuit components having a reactive impedance means connected with said rectifier to reduce the initial rectifier inverse voltage whereby increase in leakage current due to residual charge carriers in the semiconductor rectifier is minimized, said impedance means comprising, in each of said rectifier circuit components, a capacitor and a resistor in series with each other and in parallel with the semiconductor and in series with the load.

24. In a semiconductor rectifier system, comprising a transformer providing an alternating-current supply having at least one phase, the transformer providing secondary winding means, a load circuit component, a plurality of rectifier commutation circuit components connecting said secondary winding means wth said load circuit component and each comprising a half-wave germanium semiconductor rectifier having at least one area p-n junction, and each of said rectifier circuit components having a reactive impedance means connected with said rectifier to reduce the initial rectifier inverse voltage whereby increase in leakage current due to residual charge carriers in the semiconductor rectifier is minimized, said impedance means comprising, in each of said rectifier circuit components, a capacitor and a discharge resistor in parallel connection with each other and with the semiconductor and in series with the load.

25. In a semiconductor rectifier system, comprising alternating-current supply means, and a load circuit, a half-wave rectifier body comprising a germanium semiconduc- having an area p-n junction connected between said supply means and said load circuit to supply rectified current to said load circuit, and impedance means connected with said rectifier for modifying the commencing inverse-voltage wave to diminish the rate of increase of the initial reverse leakage current in said rectifier, said impedance means comprising a capacitor in parallel connection with said rectifier.

26. In a semiconductor rectifier system, comprising alternating-current supply means, and a load circuit, a half-wave rectifier body comprising a germanium semiconductor having an area p-n junction connected between said supply means and said load circuit to supply rectified current to said load circuit, and impedance means connected with said rectifier for modifying the commencing inverse-voltage wave to diminish the rate of increase of the initial reverse leakage current in said rectifier, said impedance means comprising a capacitor in parallel connection with said rectifier.

References Cited in the file of this patent

UNITED STATES PATENTS

| | | |
|---|---|---|
| 1,900,018 | Lilienfeld | Mar. 7, 1933 |
| 2,443,100 | Edwards | June 8, 1948 |

FOREIGN PATENTS

| | | |
|---|---|---|
| 641,460 | Germany | Feb. 3, 1937 |